US006796526B2

(12) United States Patent
Boehringer

(10) Patent No.: US 6,796,526 B2
(45) Date of Patent: Sep. 28, 2004

(54) AUGMENTING FLIGHT CONTROL SURFACE ACTUATION SYSTEM AND METHOD

(75) Inventor: Wilfred Earl Boehringer, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/303,521

(22) Filed: Nov. 25, 2002

(65) Prior Publication Data

US 2004/0099763 A1 May 27, 2004

(51) Int. Cl.⁷ .............................................. B64C 3/40
(52) U.S. Cl. ..................................... 244/75 R; 244/78
(58) Field of Search ................................ 244/78, 76 R, 244/75 R, 226, 227; 91/509–514, 516–519, 521–532; 60/711, 716

(56) References Cited

U.S. PATENT DOCUMENTS

| | | | |
|---|---|---|---|
| 2,627,847 A | 2/1953 | Clark et al. | |
| 3,507,352 A | 4/1970 | Williamson | |
| 3,602,102 A | 8/1971 | Fenari | |
| 3,724,333 A | 4/1973 | Fonden et al. | |
| 3,741,073 A | * 6/1973 | Garnjost ......................... | 91/433 |
| 3,898,916 A | * 8/1975 | Renner et al. ............ | 91/411 R |
| 3,943,968 A | 3/1976 | Treichler | |
| 3,952,825 A | 4/1976 | Beyers | |
| 3,992,979 A | 11/1976 | Smith | |
| 4,143,583 A | * 3/1979 | Bauer et al. .................. | 91/509 |
| 4,201,509 A | 5/1980 | Hansen | |
| 4,232,588 A | 11/1980 | Ziplies et al. | |
| 4,531,448 A | 7/1985 | Barnes | |
| 4,669,363 A | * 6/1987 | Kreth et al. .................. | 91/516 |
| 4,779,822 A | 10/1988 | Burandt et al. | |
| 4,904,999 A | * 2/1990 | Klansnic et al. ............. | 244/194 |
| 5,074,495 A | * 12/1991 | Raymond .................... | 244/78 |
| 5,289,756 A | * 3/1994 | Kobelt ......................... | 91/368 |
| 5,538,202 A | 7/1996 | Thornburg | |
| 5,600,220 A | 2/1997 | Thoraval et al. | |
| 6,082,106 A | 7/2000 | Hamamoto | |
| 6,209,825 B1 | 4/2001 | Scott | |
| 6,244,158 B1 | * 6/2001 | Roche ........................ | 91/446 |
| 6,298,661 B1 | 10/2001 | Holder et al. | |
| 6,438,953 B1 | 8/2002 | Kamada | |

FOREIGN PATENT DOCUMENTS

EP   0 657 656 B1   3/2000

OTHER PUBLICATIONS

Article by Avtar Hayre (Northrop Corporation); Tom Dull (Northrop Corporation); Fred Meyn (GE Aircraft) published by American Institute of Aeronautics and Astronautics, Inc., with permission (92–1076 ATF YF25 Leaf4 1/31) (7 pages).
New Application of Richard T. Krantz filed simultaneouly with this application entitled "Augmenting Flight Control Surface Acutation System and Method".
U.S. patent application No. 10/303,271 (presently allowed), titled Augmenting Flight Control Surface Actuation System and Method of Richard M. Krantz, filed Nov. 25, 2002.

* cited by examiner

*Primary Examiner*—Galen L. Barefoot
(74) *Attorney, Agent, or Firm*—Harness, Dickey & Pierce, P.L.C.

(57) ABSTRACT

Apparatus for providing actuation power to an aircraft flight control surface. The apparatus includes a first actuator and a second actuator, where the second actuator has a bypass mode and an assist mode. The mode of the second actuator is determined by a load on the first actuator. When the second actuator is in the bypass mode, the first actuator provides the actuation power for the aircraft flight control surface. But, when the second actuator is in the assist mode, both the first and second actuators provide the actuation power for the aircraft flight control surface. Accordingly, the apparatus allows the flight control surface to be operated in a more efficient manner with less hydraulic flow being required.

24 Claims, 2 Drawing Sheets

US 6,796,526 B2

AUGMENTING FLIGHT CONTROL SURFACE ACTUATION SYSTEM AND METHOD

FIELD OF THE INVENTION

The present invention relates generally to aircraft and more particularly to flight control surface actuation systems.

BACKGROUND OF THE INVENTION

Power Control Units (PCU) are used to apply loads for positioning and maintaining the position of aircraft flight control surfaces such as ailerons, elevators, rudders, spoilers, etc. Conventional PCUs are typically sized for stall load and a required rate. The required rate typically involves low loads, either a no-load condition, a low-load condition, or a maximum allowable time to travel from surface faired to a specified surface position under specific flight conditions. For simplicity, subsequent discussions herein shall assume a no-load rate requirement. Stall load is referred to as the maximum amount of force that the PCU actuator can exert. The maximum no-load rate refers to the fastest rate at which an actuator piston can move when the control valve is wide open and no load is on the actuator.

Sizing a PCU according to a stall load and a required rate leads to inefficiencies due to flight dynamics. That is, conventional PCUs are relatively inefficient in terms of the required horsepower and hydraulic system weight under high rate and low load conditions (e.g., near "aerodynamic neutral" or no load for the flight control surface). The term "aerodynamic neutral" refers to the position of the flight control surface at which the net air load on the surface is zero such as when the pressure below a horizontally-oriented flight control surface is equal to the pressure above the surface.

SUMMARY OF THE INVENTION

Accordingly, a need exists for a flight control surface actuation system and method that is highly efficient and well suited for use with the present day commercial aircraft. The system should substantially reduce the hydraulic fluid flow and horsepower required to provide sufficient actuation power to meet the actuation requirements during normal and emergency flight conditions of the aircraft. Ideally, the system should provide a stall load and a maximum no-load rate that are at least comparable (i.e., substantially identical) with conventional PCUs.

In one preferred form, the present invention provides an apparatus for providing actuation power to an aircraft flight control surface. The apparatus includes a first actuator and a second actuator, where the second actuator has a bypass mode and an assist mode. The mode of the second actuator is based upon the load of the first actuator. When the second actuator is in the bypass mode, the first actuator provides the actuation power for the aircraft flight control surface. But, when the second actuator is in the assist mode, both the first and second actuators provide the actuation power for the aircraft flight control surface. Accordingly, the apparatus allows the flight control surface to be operated in a more efficient manner with less hydraulic flow being required.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

Figure 1:
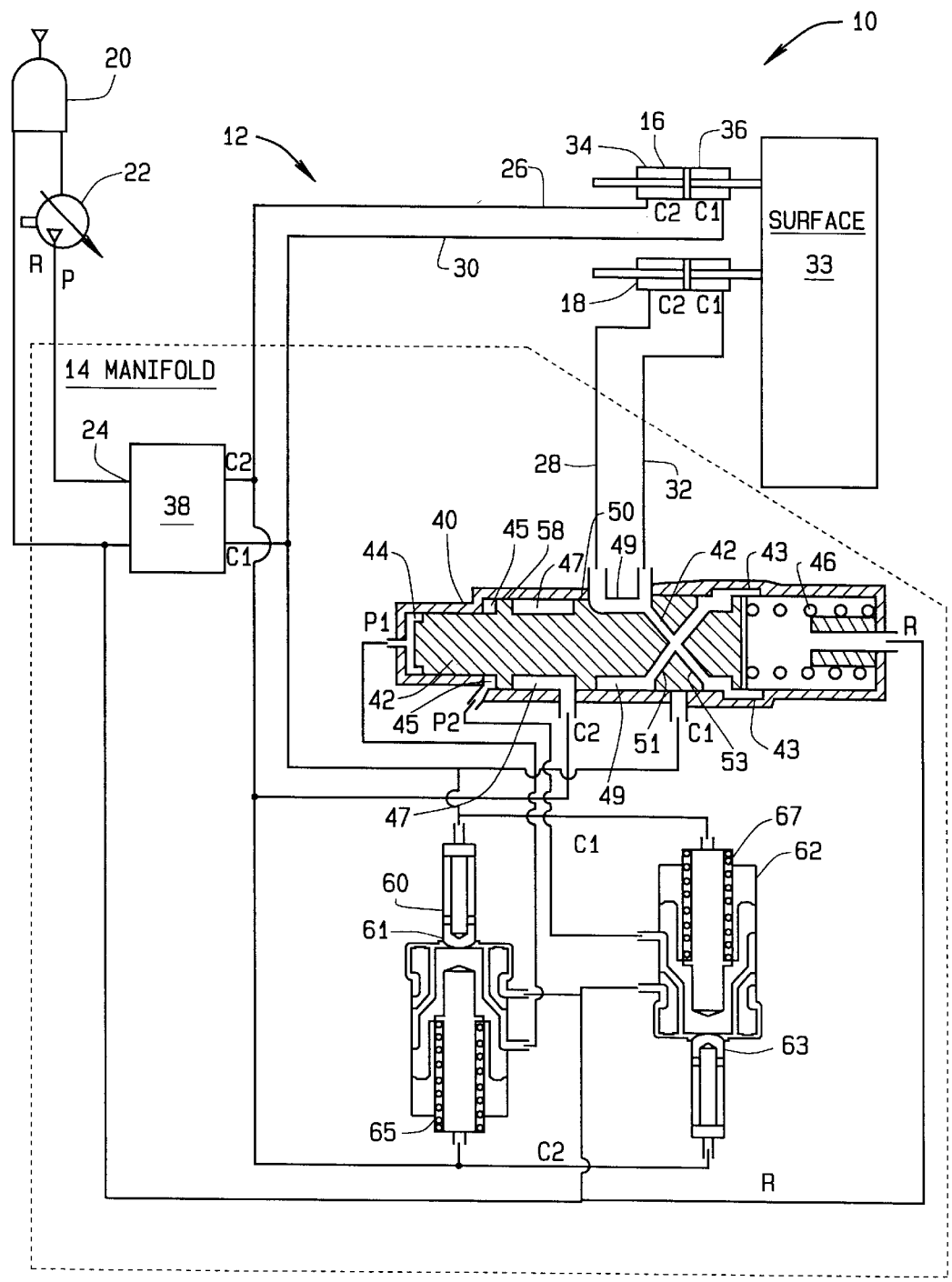
FIG. 1 is a schematic diagram of an augmenting flight control surface actuation system according to a first preferred embodiment of the present invention.

Referring to FIG. 1, there is shown an augmenting flight control surface actuation system, generally indicated by reference number 10 according to one preferred embodiment of the present invention. Generally, the system 10 comprises an augmenting PCU 12 that includes a manifold or flight control module 14, a first actuator 16, and a second actuator 18 that has an assist mode and bypass mode. The augmenting PCU 12 is fluidically connected to a pressure source P (e.g., a fluid reservoir 20 and a pump 22) that supplies the augmenting PCU 12 with a pressurized working fluid. During use, the operating mode (i.e., assist and bypass) of the second actuator 18 is at least partially based upon the load of the first actuator 16 such that the secondary actuator 18 does not absorb any hydraulic pressure until high loads are required.

During low load conditions, the second actuator 18 is bypassed and remains in a passive or standby mode such that the first actuator 16 provides the actuation power for the flight control surface 33. But, the first and second actuators 16 and 18 are both pressurized and used to provide actuation power for the flight control surface 33 when high load operating conditions exist (e.g., when high hinge moment demands exist).

Accordingly, the augmenting PCU 12 allows the flight control surface 33 to be operated with less hydraulic flow than a conventional PCU configuration. As used herein, "conventional PCUs" include single-actuator configurations and multi-actuator configurations wherein each of the multiple actuators is associated with its own complete hydraulic system (e.g., pump and reservoir) and the multiple actuators are used in combination to operate a flight control surface 33 such that an equivalent amount of fluid is required to achieve the same actuation power as a single actuator.

The augmenting PCU 12 requires substantially less hydraulic fluid flow to provide a stall load and a maximum no-load rate that are at least comparable (i.e., substantially identical) to that which is provided by conventional PCUs. Compared to conventional PCUs, the augmenting PCU 12 is more efficient and reduces hydraulic horsepower demands because the lower hydraulic fluid flow demands translate into less horsepower extraction from the engines. Moreover, the augmenting PCU 12 allows for the use of smaller aircraft hydraulic pumps and smaller diameter hydraulic fluid distribution lines, which in turn leads to significant cost and weight reductions and improved fuel efficiency.

It should also be noted that the augmenting flight control surface actuation system 10 shown in FIG. 1 is for illustration purposes only. In other embodiments, other manifolds, control valves and hydraulic systems may be used depending at least in part on the particular actuators used and the particular aircraft in which the system 10 will be used.

With further reference to FIG. 1, the fluid reservoir 20 and pump 22 supply the pressurized working fluid to the augmenting PCU 12. The pump 22 may comprise any of a wide range of pumps including hydraulic pumps, engine driven pumps, electrically driven pumps, air or wind driven pumps, ram air turbine (RAT) pumps, among others.

As explained in greater detail below, the pump 22 increases the pressure of, and pumps a working fluid from, the reservoir 20 into the augmenting PCU 12 via a pressure port or inlet 24. The pressure at which the working fluid enters the augmenting PCU 12 as well as the pressure of the working fluid within the reservoir 20 will likely depend at least in part on the application in which the system 10 is being used. By way of example only, the reservoir pressure of the fluid may be about 50 pounds per square inch (psi), and the pump 20 may increase the fluid pressure from about 50 psi up to system working pressure, generally about 3000 psi or higher.

After the working fluid has been used by and thus circulated through the augmenting PCU 12, the working fluid is returned back to the reservoir 20 at the reservoir pressure. From the reservoir 20, the working fluid is again supplied to the pump 22. Accordingly, the system 10 constitutes a closed fluid system.

The system 10 also includes the first and second actuators 16 and 18. In FIG. 1, the actuators 16 and 18 are shown positioned in parallel. However, in other embodiments, the first and second actuators may be positioned in tandem (i.e., end to end). The positioning of the actuators will likely depend at least in part on the geometry of the wing and the available space in which the actuators are being installed.

In addition, the system 10 may also include more than two actuators (i.e., three or more actuators) with the number of actuators being used depending at least in part on the space available for installing the actuators, actuation power needed, among others factors. For example, in an alternative embodiment, the system may be configured to include one primary actuator and two secondary actuators wherein each of the secondary actuators has an independently controlled bypass mode and assist mode and may be configured to actuate at a different augmenting pressures, to match the surface hinge moment requirements. The two secondary actuators may be positioned and operated in parallel or tandem. In yet other embodiments, the system may include any number of (i.e., one or more) secondary actuators, and each secondary actuator may be configured to actuate at a different pressure (e.g., 1500 psi, 2000 psi, 2500 psi, etc.) to follow the surface hinge moment curve.

The first and second actuators 16 and 18 may comprise any of a wide range of actuators now known in the art or that may be developed in the future. Even though actuators are well-known in the art, a brief description of an exemplary actuator will be given in order to provide a more understandable basis for understanding the present invention.

Briefly, each actuator 16 and 18 includes a piston that is movably disposed within an actuator barrel. Each actuator also includes a shaft or rod. One end of the shaft is engaged with the piston while the other end is engaged with the flight control surface 33.

The actuator barrel is fluidically connected to the fluid reservoir 20 and pump 22 via an extend fluid conduit (e.g., 26 and 28) and a retract fluid conduit (e.g., 30 and 32). Each actuator barrel is sized such the piston moves within the barrel when the barrel receives a supply of pressurized working fluid from the reservoir 20 and pump 22. The actuator barrel includes end caps and fluidic sealing members (e.g., o-rings, etc.) to fluidically seal the actuator barrel so that the pressurized working fluid is prevented from escaping the actuator barrel other than by the corresponding fluid conduit.

As shown in FIG. 1, each actuator 16 and 18 is fluidically connected to the manifold 14 via a respective extend fluid conduit or line 26, 28 and a respective retract fluid conduit or line 30, 32. When provided with the pressurized working fluid, the flow direction of the pressurized working fluid determines whether the actuators 16 and 18 extend or retract and thus operate to retract or extend the flight control surface 33. For example, the first actuator's 16 piston extends when the pressurized working fluid enters the extend side 34 of the first actuator 16 via the extend fluid conduit 26. The working fluid is discharged from the retract side 36 of the first actuator 16 via the retract fluid conduit 30 for return to the reservoir 20. Conversely, the first actuator's 16 piston retracts when the pressurized working fluid is provided to the retract side 36 via its retract fluid conduit 30. In this latter instance, the working fluid is discharged from the extend side 34 of the first actuator 16 via the extend fluid conduit 26 for return to the reservoir 20.

Although the first and second actuators 16 and 18 may be substantially identical, such need not be the case. For example, the second actuator 18 may have a longer stroke length than the first actuator 16. Or for example, the multiple actuators comprising the augmenting flight control surface actuation system may be sized differently (e.g., first actuator sized for minimum stiffness, second actuator sized for stall loads). The actuator sizes are preferably based upon the rate/hinge moment requirements of the particular application in which the actuators 16 and 18 are being used.

During operation, the manifold 14 receives the pressurized working fluid from the pump 22 and reservoir 20 via the inlet 24. The manifold 14 then distributes the pressurized working fluid to the active actuator(s) (i.e., 16 or 16 and 18). The manifold 14 also receives the working fluid from the active actuator(s) after the working fluid has been used thereby. Accordingly, the manifold 14 controls the operation of the first and second actuators 16 and 18.

In the illustrated embodiment, the system 10 includes a control valve 38 for determining the flow direction and the amount of pressurized working fluid to the differential trigger valves 60 and 62 and to the bypass or mode select valve 40, which is installed in series between the control valve 38 and the second actuator 18. The control valve 38 may comprise any of a wide range of flight control valves including, but not limited to, electro-hydraulic servo valves (EHSV), direct drive valves (DDV), a mechanically controlled valve, electrically controlled valve, among other valve types. The control valve 38 may also comprise a single, tandem, or multiple control valve configuration depending on the particular application in which the system 10 is being used.

The bypass valve 40 is used to select between the bypass mode and the assist mode for the second actuator 18. Accordingly, the bypass valve 40 includes a bypass setting and an assist setting. When the bypass valve 40 is in its bypass setting, the second actuator 18 is bypassed such that the first actuator 16 provides the actuation power for the flight control surface 33. Conversely, the first and second actuators 16 and 18 are both pressurized and used to provide the actuation power for the flight control surface 33 when the bypass valve 40 is in its assist setting.

FIG. 1 shows a cross-sectional side view of the bypass valve 40 in its bypass setting. The bypass valve 40 includes a slide 42 that is moveable between a first position (FIG. 1) and a second position in which the slide 42 is shifted to the right of the first position. The bypass valve 40 further includes a biasing device 46 (e.g., a coil spring, hydraulic pressure, etc.) for biasing the slide 42 in its first position. The bypass valve 40 is in its bypass setting when the slide 42 is in the first position.

The bypass valve 40 includes seven hydraulic ports, namely a return port R, pilot ports P1 and P2, ports C1 and C2 fluidically connected to the control valve 38, and ports C1 and C2 fluidically connected to the second actuator 18.

The return port R is fluidically connected to the system's 10 return source R (i.e., reservoir 20). The return port R is also fluidically connected to a substantially annular chamber 43 defined by the bypass valve 40.

The pressure port P1 is fluidically connected to the differential trigger valve 60 and to a chamber 44 defined by pass valve 40. Accordingly, the pilot port P1 can be used to provide a hydraulic bias via chamber 44 to the slide 42.

The pressure port P2 is fluidically connected to the differential trigger valve 62 and to a substantially annular chamber 45 of the bypass valve 40. Accordingly, the pilot port P2 can be used to provide a hydraulic bias via chamber 45 to the slide 42.

The bypass valve 40 is configured to define substantially annular chambers 47 and 49, which are respectively used to fluidically connect the C2 ports with each other and to fluidically connect the C1 ports with each other when the bypass valve 40 is in the assist setting. When the bypass valve 40 is in its bypass setting, however, the fluid chamber 49 fluidically connects the second actuator's C1 and C2 lines to each other, which are also fluidically connected to the system return R via the chamber 43 and passageways 51 and 53 defined by the bypass valve 40.

As shown, the chambers 47 and 49 are separated by a land 50. The chambers 45 and 47 are separated by a land 58.

The bypass valve 40 preferably maintains the second actuator 18 in its bypass mode until the bypass valve 40 is commanded to shift by either one of the two differential trigger valves 60 and 62, which are described below. Stated differently, the default mode of the second actuator 18 is preferably the bypass mode. However, when either of the differential trigger valves 60 or 62 opens, a pressurized working fluid enters the bypass valve 40 via the respective pilot pressure port P1 or P2 and works against the slide 42, eventually overcoming the biasing force of the coil spring 46 applied to the slide 42. At that point, the slide 42 will shift or move to the right from its first position to its second position, thus changing the setting of the bypass valve 40 from its bypass setting to its assist setting.

When the bypass valve 40 does shift from its bypass setting to its assist setting, the bypass valve 40 enables direct control of the second actuator 18 by the control valve 38. At that point, both actuators 16 and 18 receive substantially identical pressures and provide actuation power for the flight control surface 33.

The system 10 further includes a pair of differential trigger valves 60 and 62 that are used for causing the bypass valve 40 to change between its two settings (i.e., bypass setting and assist setting). That is, the differential trigger valves 60 and 62 are used to move the slide 42 of the bypass valve 40 between its first and second positions. Accordingly, the setting of the bypass valve 40 and thus the mode of the second actuator 18 are both dependent upon the status (i.e., open or closed) of the differential trigger valves 60 and 62. Preferably, opening (i.e., activating or triggering) either of the differential trigger valves 60 or 62 causes the bypass valve 40 to change from its bypass setting to its assist setting, which in turn changes the mode of the second actuator 18 from its bypass mode to its assist mode.

The differential trigger valves 60 and 62 are each supplied with C1 and C2 pressures that act upon differently-sized piston areas in the valves 60 and 62. In a preferred embodiment, the ratio of the piston areas upon which the pressure in each of the differential trigger valves 60 and 62 acts is nine to one (9:1). Alternatively, however, other ratios may be used depending on the particular application in which the system 10 is being used.

The differential trigger valves 60 and 62 are configured such that one or the other will fully open when an internal pressure differential exceeds a predetermined level, which may comprise any of a wide range of pressure values. More specifically, the differential trigger valve 60 is disposed to trigger or open when a sufficiently high enough internal pressure difference exists between the C1 line and the C2 line (i.e., when the C1 pressure exceeds the C2 pressure by a predetermined level). Accordingly, the operation of the differential trigger valve 60 is based upon the load of or differential pressure across the first actuator 16, that is being used by the first actuator 16 to retract the surface 33.

The differential trigger valve 62 is disposed to trigger or open when a sufficiently high enough internal pressure difference exists between the C2 line and the C1 line (i.e., when the C2 pressure exceeds the C1 pressure by a predetermined level). Accordingly, the operation of the differential trigger valve 62 is based upon the load of or differential pressure across the first actuator 16, which is being used to extend the surface 33.

When opened, the differential trigger valve 60 allows command or pilot pressure to be provided to the bypass valve 40 via the pressure port P1. Once the valve 60 is triggered or opened, the reset differential pressure between C1 and C2 required to reset the differential trigger valve 60 may vary depending on the particular application in which the system 10 is being used. Moreover, the reset differential pressure for the valve 60 can be varied by changing the hydraulic or piston area ratio for the differential trigger valve 60. During operation, the action of the differential trigger valve 60 is such that the C1 pressure forces the valve 60 to slowly move against the biasing force of the C2 pressure and the biasing device 65 (e.g., coil spring, etc.) until a port uncovers on the high pressure side 61 of the valve 60. Once a port is uncovered within the valve 60, the valve's 60 piston area then changes dramatically such that the valve 60 fully opens relatively instantly or immediately.

When the differential trigger valve 62 is opened, command or pilot pressure is provided to the bypass valve 40 via the pressure port P2. The reset differential pressure required to reset the differential trigger valve 62, once activated, may vary depending on the particular application in which the system 10 is being used. Moreover, the reset differential pressure for the valve 62 can be varied by changing its piston area ratio. During operation, the action of the differential trigger valve 62 is such that the C2 pressure forces the valve 62 to slowly move against the biasing force of the C1 pressure and the biasing device 67 (e.g., coil spring, etc.)

until a port uncovers on the high pressure side 63 of the valve 62. Once a port is uncovered within the valve 62, however, the valve's 62 piston area changes dramatically such that the valve 62 fully opens relatively instantly or immediately.

Figure 2:
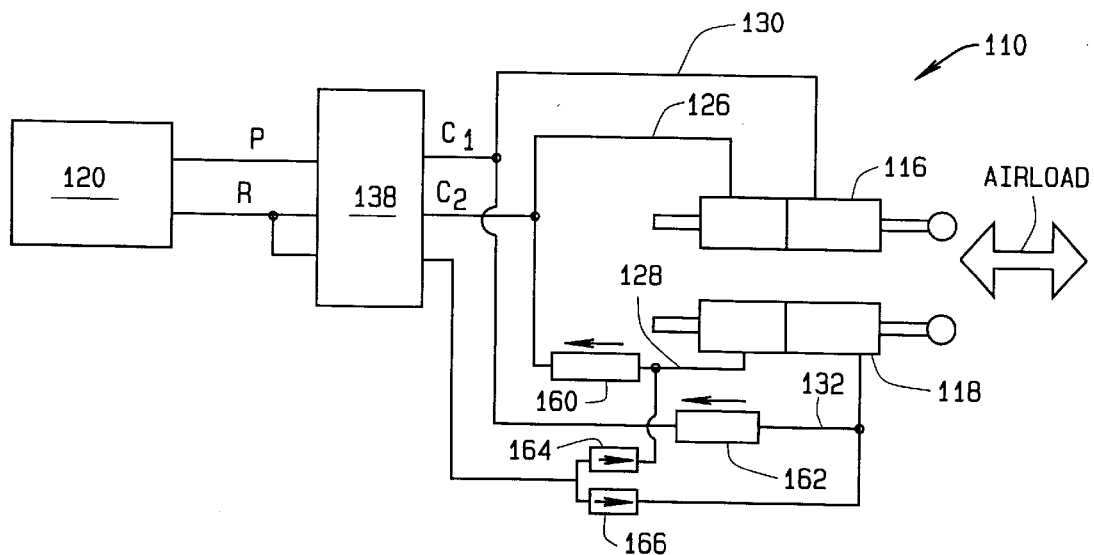
FIG. 2 is a schematic diagram of an augmenting flight control surface actuation system according to a second preferred embodiment of the present invention.

Referring now to FIG. 2, there is shown a second embodiment 110 of the augmenting flight control surface actuation system. The system 110 comprises a triggered balance relief valve 160 installed in the extend line 128 of the second actuator 118 and a triggered balance relief valve 162 installed in the retract line 132 of the second actuator 118.

The triggered balance relief valves 160 and 162 are configured such that one or the other will fully open when the pressure downstream of the control valve 138 exceeds a predetermined level, which may comprise any of a wide range of pressure values. Accordingly, the operation of the triggered balance relief valves 160 and 162 are dependent upon the pressure downstream of the control valve 138.

The triggered balance relief valve 160 prevents or blocks pressure to the second actuator 118 until the C2 pressure upstream of the triggered balance relief valve 160 exceeds the relief valve setting or cracking pressure of the triggered relief valve 160. When the upstream C2 pressure exceeds the cracking pressure, the triggered balance relief valve 160 fully opens in a substantially instantaneous manner.

The triggered balance relief valve 162 (FIG. 3) prevents or blocks pressure to the second actuator 118 until the C1 pressure upstream of the triggered balance relief valve 162 exceeds the relief valve setting or cracking pressure of the triggered relief valve 162. When the upstream C1 pressure exceeds the cracking pressure, the triggered balance relief valve 162 overcomes the biasing force applied by the biasing device 167 (e.g., coil spring) and fully opens in a substantially instantaneous manner.

The cracking pressure for each of the triggered balance relief valves 160 and 162 may comprise any of a wide range of pressure values. For example, the triggered balance relief valve 160 may have a relief valve setting of 4500 psi such that the triggered balance relief valve 160 fully opens when the C2 pressure upstream of the triggered balance relief valve 160 exceeds 4500 psi, assuming a 5000 psi operating pressure. The triggered balance relief valve 162 may also have a relief valve setting of 4500 psi such that the triggered balance relief valve 162 fully opens when the C1 pressure upstream of the trigger balanced relief valve 162 exceeds 4500 psi, assuming a 5000 psi operating pressure.

Figure 3:
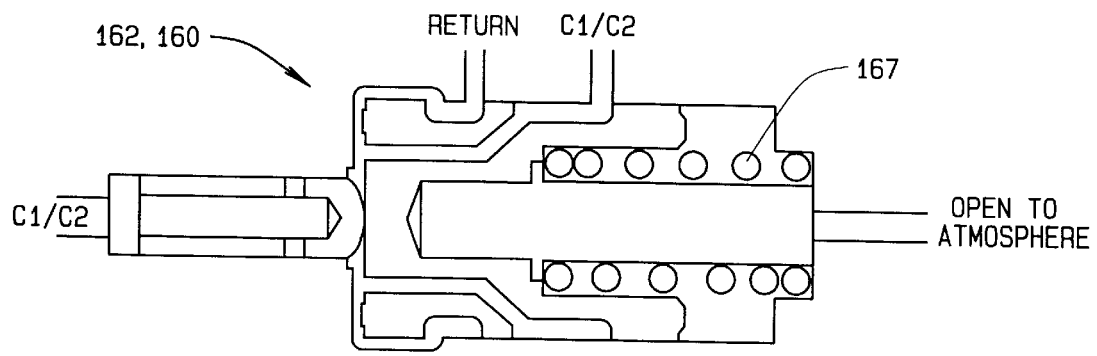
FIG. 3 is a cross-sectional view of a triggered balance relief valve shown in FIG. 2 illustrating the triggered balance relieve valve in the closed position.

Each triggered balance relief valve 160 and 162 is indexed to atmosphere, as shown in FIG. 3. Moreover, each triggered balance relief valve 160 and 162 has free reverse flow to allow the fluid to return to the control valve 138 and to enable the operation of the first actuator 116 to move the second actuator 118 when the second actuator 118 is powerless.

The system 110 further includes anti-cavitation check valves 164 and 166. As the second actuator 118 moves, fluid is forced through the corresponding anti-cavitation check valves 164 or 166 to fill one side of the second actuator 118. The fluid from the opposite side of the second actuator 118 returns to the control valve 138 via the respective free reverse flow balanced relief valves 160 or 162.

During operation, the actuation power is provided by the first actuator 116 when the triggered balance relief valves 160 and 162 are both closed. However, the actuation power is provided by the first and second actuators 116 and 118 whenever either of the triggered balance relief valves 160 and 162 is fully open (i.e., when the respective C1 or C2 upstream pressure exceeds the cracking pressure for the corresponding triggered relief valve 162 or 160). Accordingly, the second actuator 118 is pressurized when the first actuator 116 must endure high pressures or loads.

In another form, the present invention also provides methods of providing actuation power to an aircraft flight control surface. Preferably, the method comprises the steps of: selecting between a bypass mode and an assist mode for a second actuator 18, 118, the selection being at least partially based on a load of a first actuator 16, 116 (e.g., internal differential pressure across the first actuator 16, internal pressure downstream of the control valve 138 within either the first actuator's 116 extend or retract line 126 or 130); using the first actuator 16, 116 to provide the actuation power for the aircraft flight control surface 33 when the second actuator 18, 118 is in the bypass mode; and using the first and second actuators 16, 116 and 18, 118 to provide the actuation power for the aircraft flight control surface 33 when the second actuator 18, 118 is in the assist mode.

Accordingly, the present invention provides an augmenting flight control actuation system that substantially reduces the hydraulic fluid flow and horsepower demands while providing sufficient actuation power to meet the actuation requirements during normal and emergency conditions of the aircraft. Indeed, the systems 10 and 110 require substantially less hydraulic fluid flow to provide a stall load and a maximum no-load rate that are at least comparable (i.e., substantially identical) with conventional PCUs. In addition, the systems 10 and 110 are relatively simplistic, easy to implement, and inexpensive.

The reduced hydraulic flow demands provided by the invention translates into less horsepower extraction from the engines, smaller and lighter hydraulic pumps, and smaller diameter hydraulic fluid distribution lines and tubing. The invention also allows for a reduction in the size of the manifold by way of the internal fluid flow passages and components being sized for less flow. Accordingly, the invention provides both cost and weight reductions in flight control systems, which can be especially beneficial to the increasingly weight conscious commercial aircraft development. The invention also reduces hydraulic system transients during PCU operation, which in turn reduces the need for adding accumulators solely to dampen transients.

The invention utilizes flight proven and mature aircraft technology, thus making it a very reliable approach. For example, the present invention can be used with existing hydraulic pumps, hydraulic seals, solenoid controlled mode switching, aluminum manifolds, and 3000 psi or higher hydraulic systems.

Because the present invention does not rely on the flight regime of the aircraft to determine the actuator affective area but instead relies upon internal PCU pressure, the present invention is well suited for use with subsonic aircraft, supersonic or high speed civil transport aircraft, among other aircraft. In addition, many aircraft have very thin wings which provide very small envelopes for packaging a flight control actuator therein. However, the present invention is ideally suited for installation within thin wings in that it allows for multiple actuators to be stacked in tandem or parallel. The present invention is also compatible with a wide range of system architectures including mechanical, conventional, power-by-wire, and fly-by-wire system architectures.

It is anticipated that the invention will be applicable to any of a wide range of control surfaces (e.g., but not limited to, ailerons, elevators, rudders, spoilers, flaperons, among others) and any of wide range of aircraft (e.g., but not limited to, fighter jets, commercial jets, private jets, propeller powered aircraft, among others) regardless of the manner in which the aircraft is piloted (e.g., directly, remotely, via automation, or in a combination thereof, among others). Accordingly, the specific references to flight control surface and aircraft herein should not be construed as limiting the scope of the present invention to only one specific form/type of flight control surface or aircraft.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. Apparatus for providing actuation power to an aircraft flight control surface, the apparatus comprising:
   a first actuator;
   a second actuator including a bypass mode and an assist mode, the mode of the second actuator being at least partially based on a load of the first actuator;
   the second actuator being in the bypass mode during a low load operating condition such that the first actuator provides the actuation power for the aircraft flight control surface when the second actuator is in the bypass mode during said low load operating condition; and
   the second actuator being in the assist mode during a high load operating condition such that the first and second actuators provide the actuation power for the aircraft flight control surface when the second actuator is in the assist mode during said high load operating condition.

2. Apparatus for providing actuation power to an aircraft flight control surface, the apparatus comprising:
   a first actuator;
   a second actuator including a bypass mode and an assist mode, the mode of the second actuator being at least partially based on a load of the first actuator;
   the first actuator providing the actuation power for the aircraft flight control surface when the second actuator is in the bypass mode;
   the first and second actuators providing the actuation power for the aircraft flight control surface when the second actuator is in the assist mode; and
   wherein the bypass mode comprises a default mode for the second actuator.

3. The apparatus of claim 1, wherein the assist mode comprises a default mode for the second actuator.

4. The apparatus of claim 1, further comprising a bypass valve for selecting between the bypass mode and the assist mode for the second actuator.

5. The apparatus of claim 4, further comprising at least one differential trigger valve operatively associated with the bypass valve such that triggering the at least one differential trigger valve causes the bypass valve to select the other one of said modes for the second actuator, the at least one differential trigger valve being triggered when an internal differential pressure across the first actuator exceeds a maximum pressure value.

6. The apparatus of claim 5, wherein the at least one differential trigger valve comprises:
   a first differential trigger valve disposed to trigger when the internal pressure differential across the first actuator for retracting the aircraft flight control surface exceeds a maximum pressure value; and
   a second differential trigger valve disposed to trigger when the internal pressure differential across the first actuator for extending the aircraft flight control surface exceeds a maximum pressure value.

7. Apparatus for providing actuation power to an aircraft flight control surface, the apparatus comprising:
   a first actuator;
   a second actuator including a bypass mode and an assist mode, the mode of the second actuator being at least partially based on a load of the first actuator;
   the first actuator providing the actuation power for the aircraft flight control surface when the second actuator is in the bypass mode;
   the first and second actuators providing the actuation power for the aircraft flight control surface when the second actuator is in the assist mode; and
   at least one triggered balance relief valve for selecting between the bypass mode and the assist mode for the second actuator, the at least one triggered balance relief valve selecting the other one of said modes for the second actuator when the at least one triggered balance relief valve is triggered, the at least one triggered balance relief valve being triggered when a pressure upstream of the at least one triggered balance relief valve exceeds a maximum pressure value.

8. The apparatus of claim 7, wherein the at least one triggered balance relief valve comprises:
   a first triggered balance relief valve disposed within an extend fluid line of the second actuator; and
   a second triggered balance relief valve disposed within a retract fluid line of the second actuator.

9. The apparatus of claim 7, further comprising at least one anti-cavitation check valve in fluid communication with the second actuator.

10. The apparatus of claim 1, wherein the first actuator comprises a plurality of actuators.

11. The apparatus of claim 1, wherein the second actuator comprises a plurality of actuators.

12. Apparatus for providing actuation power to an aircraft flight control surface, the apparatus comprising:
   a first actuator;
   a second actuator including a bypass mode and an assist mode;
   means for selecting between the bypass mode and the assist mode for the second actuator, the mode selection for the second actuator being at least partially based on a load of the first actuator;
   the second actuator being in the bypass mode during a low load operating condition such that the first actuator provides the actuation power for the aircraft flight control surface when the second actuator is in the bypass mode during said low load operating condition; and
   the second actuator being in the assist mode during a high load operating condition such that the first and second actuators provide the actuation power for the aircraft flight control surface when the second actuator is in the assist mode during said high load operating condition.

13. An aircraft comprising:
   a flight control surface;
   a first actuator;
   a second actuator including a bypass mode and an assist mode, the mode of the second actuator being at least partially based on a load of the first actuator;

the second actuator being in the bypass mode during a low load operating condition such that the first actuator provides the actuation power for the aircraft flight control surface when the second actuator is in the bypass mode during said low load operating condition; and the second actuator being in the assist mode during a high load operating condition such that the first and second actuators provide the actuation power for the aircraft flight control surface when the second actuator is in the assist mode during said high load operating condition.

14. The aircraft of claim 13, further comprising a bypass valve for selecting between the bypass mode and the assist mode for the second actuator.

15. The aircraft of claim 13, further comprising at least one differential trigger valve operatively associated with the bypass valve such that triggering the at least one differential trigger valve causes the bypass valve to select the other one of said modes for the second actuator, the at least one differential trigger valve being triggered when an internal differential pressure across the first actuator exceeds a maximum pressure value.

16. The aircraft of claim 15, wherein the at least one differential trigger valve comprises:

a first differential trigger valve disposed to trigger when the internal pressure differential across the first actuator for retracting the aircraft flight control surface exceeds a maximum pressure value; and a second differential trigger valve disposed to trigger when the internal pressure differential across the first actuator for extending the aircraft flight control surface exceeds a maximum pressure value.

17. An aircraft comprising:

a flight control surface;

a first actuator;

a second actuator including a bypass mode and an assist mode, the mode of the second actuator being at least partially based on a load of the first actuator;

the first actuator providing actuation power for the flight control surface when the second actuator is in the bypass mode;

the first and second actuators providing actuation power for the flight control surface when the second actuator is in the assist mode; and at least one triggered balance relief valve for selecting between the bypass mode and the assist mode for the second actuator, the at least one triggered balance relief valve selecting the other one of said modes for the second actuator when the at least one triggered balance relief valve is triggered, the at least one triggered balance relief valve being triggered when a pressure upstream of the at least one triggered balance relief valve exceeds a maximum pressure value.

18. The aircraft of claim 17, wherein the at least one triggered balance relief valve comprises:

a first triggered balance relief valve disposed within an extend fluid line of the second actuator; and a second triggered balance relief valve disposed within a retract fluid line of the second actuator.

19. The aircraft of claim 17, further comprising at least one anti-cavitation check valve in fluid communication with the second actuator.

20. The aircraft of claim 13, wherein the first actuator comprises a plurality of actuators.

21. The aircraft of claim 13, wherein the second actuator comprises a plurality of actuators.

22. A method of providing actuation power to an aircraft flight control surface, the method comprising:

selecting between a bypass mode and an assist mode for a second actuator, the selection being at least partially based on a load of a first actuator;

using the first actuator to provide the actuation power for the aircraft flight control surface when the second actuator is in the bypass mode during a low load operation condition; and using the first and second actuators to provide the actuation power for the aircraft flight control surface when the second actuator is in the assist mode during a high load operating condition.

23. The method of claim 22, wherein selecting between a bypass mode and an assist mode for a second actuator comprises:

selecting the assist mode when an internal differential pressure across the first actuator exceeds a maximum pressure value; and selecting the bypass mode when the internal differential pressure across the first actuator falls below a minimum pressure value.

24. The method of claim 22, wherein selecting between a bypass mode and an assist mode for a second actuator comprises:

selecting the assist mode when a pressure upstream of the first actuator exceeds a maximum pressure value; and selecting the bypass mode when the pressure upstream of the first actuator falls below a minimum pressure value.

* * * * *